United States Patent
Frommelt et al.

[15] 3,699,733
[45] Oct. 24, 1972

[54] LOADING DOCK SHELTERS

[72] Inventors: Cyril P. Frommelt; Sylvan J. Frommelt, both of Dubuque, Iowa

[73] Assignee: Dubuque Awning & Tent Company, Dubuque, Iowa

[22] Filed: Oct. 30, 1970

[21] Appl. No.: 85,610

[52] U.S. Cl. .................................. 52/204, 135/5 R
[51] Int. Cl. ........................... E04f 10/04, E06b 1/56
[58] Field of Search ......... 88/1 C; 297/395, 415, 422; 14/71; 52/204; 135/5 R

[56] References Cited

UNITED STATES PATENTS

| | | |
|---|---|---|
| 3,403,489 | 10/1968 | Frommelt et al. ............52/204 |
| 3,060,471 | 10/1962 | Der Yuen et al. ............14/71 |
| 3,352,314 | 11/1967 | Frommelt et al. .........135/5 A |
| 3,099,847 | 8/1963 | Lodjic et al. ....................14/71 |
| 3,286,417 | 11/1966 | Dazzo ..........................52/204 |
| 3,461,627 | 8/1969 | Conger ......................135/5 A |
| 3,538,655 | 11/1970 | Frommelt et al. ............52/173 |

Primary Examiner—Henry C. Sutherland
Attorney—Johnston, Root, O'Keeffe, Keil, Thompson and Shurtleff

[57] ABSTRACT

A loading dock shelter embodying a cover member carried by a rigid supporting frame with a resilient pad forming the bottom wall therefor and holding the lower portion of the cover in operative position.

5 Claims, 3 Drawing Figures

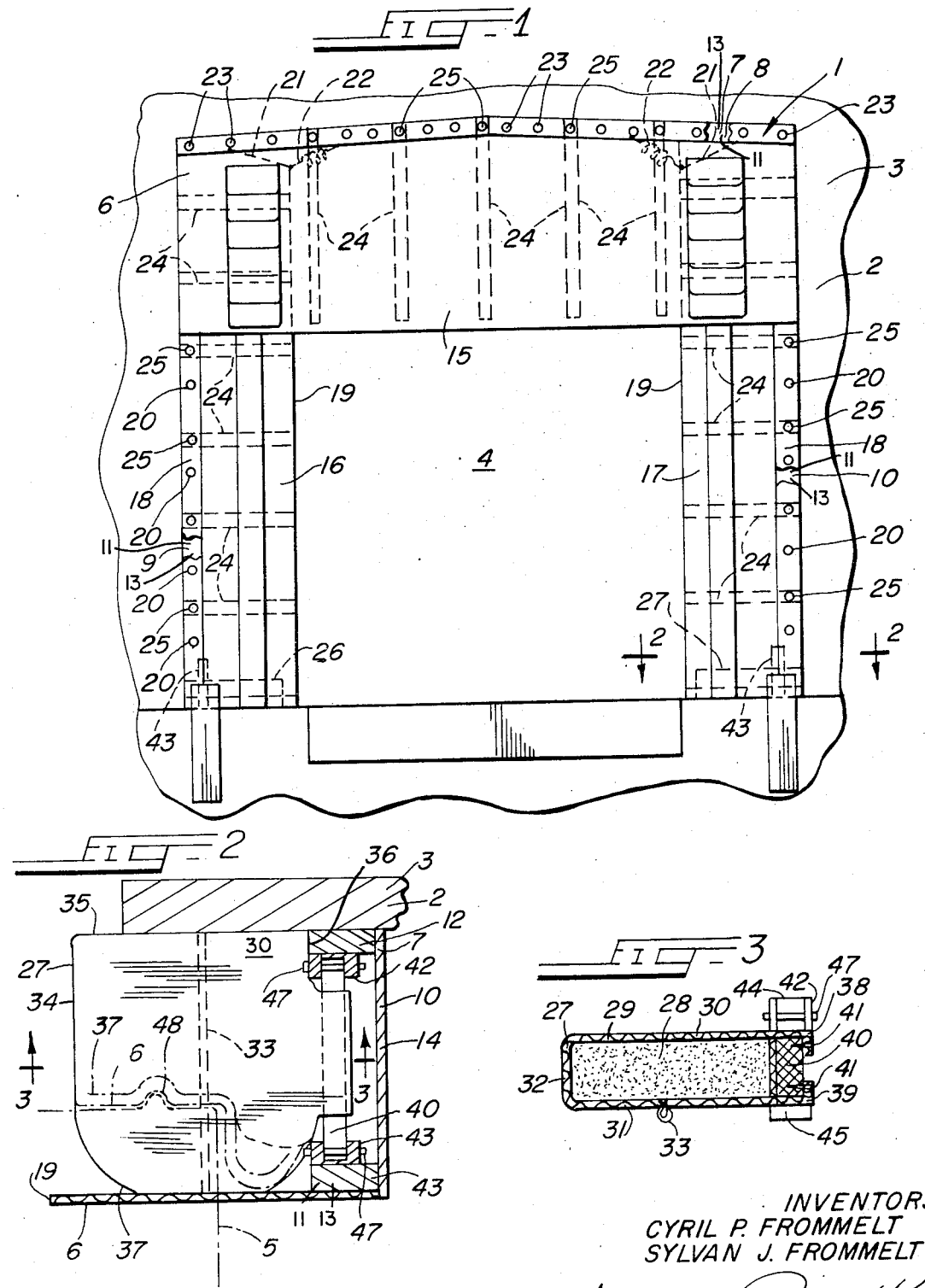

3,699,733

LOADING DOCK SHELTERS

BACKGROUND OF THE INVENTION

This invention relates to loading dock shelters, and, more particularly, to such shelters that are particularly well adapted for use as truck dock shelters.

It is a primary object of the present invention to afford a novel loading dock shelter.

Loading dock shelters of the retractable type, such as, for example, loading dock shelters of the type shown in our U.S. Pat. No. 2,892,463 have been heretofore known in the art. Also, loading dock shelters of the retractable type and embodying resilient pads at the bottom thereof, such as, for example, loading dock shelters of the type shown in our U.S. Pat. No. 3,352,314 have been heretofore known in the art. Such loading dock shelters have been highly successful and afford effective shelter for men and materials during the loading and unloading of a truck, or the like, through a warehouse door equipped with such shelters.

Loading dock shelters of the types shown in both of our aforementioned patents may be said to be shelters which embody yieldable frames around the doorway of a warehouse on which they are mounted. Both of them afford effective, automatic sealing engagement between the shelters and the trucks operatively engaged therewith.

In addition, loading dock shelters of the type embodying rigid frames, with cover members disposed in operative position thereon to be yieldingly held in sealing engagement with the tops and sides of trucks operatively engaged therewith, such as, for example, loading dock shelters of the type shown in our U.S. Pat. No. 3,403,489 have also been known in the art. These latter loading dock shelters also have been highly successful and afford effective, automatic sealing engagement between the shelters and the trucks operatively engaged therewith. In these latter shelters heretofore known in the art, the bottoms thereof have either been open or have been closed by fabric, bottom wall panels, and the like. In some instances, these bottom wall panels have had spring stays embodied therein, for resiliently urging the latter toward normal, outwardly projecting operative position, such as, for example, the bottom panel shown in our aforementioned U.S. Pat. No. 3,403,489.

It is an important object of the present invention to enable loading dock shelters to be afforded which embody a substantially rigid supporting frame, with the cover of the shelter effective to automatically sealingly engage a truck, or the like, but with the bottom of the shelter being afforded by a novel pad structure constituted and arranged in a novel and expeditious manner.

It has been found in the past that with a loading dock shelter of the rigid supporting frame type constructed in such a manner as to embody a bottom wall panel having the aforementioned stays therein, the side panels of the shelter, in some instances, tended to "jump over" the bottom wall during operative engagement with a truck, or the like. It is an important object of the present invention to prevent such undesired movement of the side panels of a rigid-frame type of loading dock shelter relative to the bottom walls thereof.

Another object of the present invention is to afford a novel loading dock shelter of the type embodying a substantially rigid supporting frame having a novel, compressible resilient bottom wall constituted and arranged in a novel and expeditious manner.

A further object of the present invention is to afford a novel loading dock shelter of the aforementioned type which is practical and efficient in operation, and which may be readily and economically produced commercially.

Other and further objects of the present invention will be apparent from the following description and claims and are illustrated in the accompanying drawings, which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front elevational view of loading dock shelter embodying the principles of the present invention;

FIG. 2 is a detail sectional view taken substantially along the line 2—2 in FIG. 1; and FIG. 3 is a fragmentary, detail sectional view taken substantially along the line 3—3 in FIG. 2.

DESCRIPTION OF THE EMBODIMENT SHOWN HEREIN

A loading dock shelter 1 embodying the principles of the present invention is shown in the drawings to illustrate the presently preferred embodiment of the present invention. The loading dock shelter 1 is of the rigid supporting frame type, and is shown herein mounted on an outer wall 2 of a warehouse 3 in surrounding relation to a doorway 4 in the warehouse wall 2, FIG. 1. As will be discussed in greater detail presently, it is operable to afford an effective shelter between a truck 5, diagrammatically shown in FIG. 2, and the doorway 4, when the truck 5 is disposed in normal operative position relative to the doorway 4 for loading and unloading operations to be effected through the rear end of the truck 5 and the doorway 4.

The loading dock shelter 1 embodies, in general, a front cover 6 mounted on a supporting frame 7 in such position that the cover 6 is disposed outwardly of the wall 2 of the warehouse 3 in position to be operatively engaged by a truck, such as the truck 5, as will be discussed in greater detail presently.

Like the loading dock shelter shown in the aforementioned U.S. Pat. No. 3,403,489, the supporting frame 7 includes an elongated top wall 8 extending across the top of the doorway 4, and two elongated side walls 9 and 10, which extend downwardly from respective opposite ends of the top wall 8. Preferably, each of the walls 8–10 is of the same construction as that of the corresponding walls shown in the aforementioned U.S. Pat. No. 3,403,489, each embodying an elongated frame 11, which includes two side members 12 and 13 extending the length thereof, with a cover member 14 mounted on the outer face of the frame 11, as illustrated in FIG. 2 with respect to the side wall 10. Each of the respective cover members 14 completely cover the outer face of the respective walls 8–10, and is preferably made of a single, self-supporting panel of a suitable water-impermeable, light permeable material, such as, for example, a translucent sheet of material comprising a composition of a resin reinforced with glass fibers, readily available on the market. They are secured to the respective frames 11 by suitable means such as nails, or cement, not shown.

The supporting frame 7 may be secured to the wall 2 of the warehouse 3 by suitable means such as bolts or screws, not shown, inserted through the side members 12 of the respective frames 11, to thereby secure the supporting frame 7 in operative position on the wall 2, with the side members 13 disposed in outwardly spaced, substantially parallel relation thereto.

The cover 6, which is mounted on supporting frame 7 in outwardly spaced relation to the warehouse 3, embodies a head curtain or top panel 15 and two side curtains or side panels 16 and 17, FIG. 1. The panels 15–17 may be made of any suitable material, but preferably they are made of a water-repellent, wear-resistant material, such as, for example, canvas duck or rubber-impregnated nylon fabric.

Each of the side curtains or side panels 16 and 17 is substantially rectangular in shape, and includes an outer longitudinally-extending edge portion 18 and an inner longitudinally-extending edge portion 19, FIG. 1. The outer longitudinal edge portions 18 of the side curtains 16 and 17 are directly attached to the top wall 8, and the inner edge portions thereof taper downwardly and are yieldingly connected to the top wall 8 by respective tension coil springs 22, FIG. 1.

The head curtain or top panel 15 of the cover 6 is elongated in a horizontal direction, and is attached along its upper longitudinal edge to the top wall 8 of the supporting frame 7 by suitable means such as screws or bolts 23. The head curtain 15 extends across the entire width of the loading dock shelter 1, and hangs downwardly from the top wall 8 of the supporting frame 7 forwardly of, but in closely adjacent relation to the side panels 16 and 17.

In mounting the loading dock shelter 1 in operative position on the warehouse 3, the top wall 8 preferably is secured to the wall 2 of the warehouse 3 by suitable means such as the aforementioned bolts or screws, not shown, in such position that it is disposed above the doorway 4 in substantially parallel relation thereto. After the top wall 8 and head curtain 15 have thus been mounted in operative position on the warehouse 3, the side walls 9 and 10, and the side curtains 16 and 17 carried thereby, are next preferably secured to the top wall 8, and the side walls 9 and 10 may then be secured to the wall 2 of the warehouse 3 by inserting bolts or screws, not shown, through the longitudinal members 12 of the frames 11 thereof.

When the loading dock shelter 1 is thus secured in operative position on the wall 2 of the warehouse 3, the side walls 9 and 10 of the supporting frame 7 are disposed laterally outwardly of the side jambs of the doorway 4 in such position that the side curtains 16 and 17 project across the adjacent portions of the doorway 4 in such position that when a truck, such as the truck 5, is disposed in the aforementioned operative position relative to the doorway 4 for loading and unloading operations, the side panels 16 and 17 engage the respective adjacent sides of the rear end of the truck 5; and the head curtain 15 is disposed in such position that it projects downwardly below the plane of the top of the doorway 4 in position to drape itself across the top of the rear end of the truck 5.

As in the loading dock shelter shown in the aforementioned U.S. Pat. No. 3,403,489, each of the panels 15–16 of the cover 6 embodies a plurality of elongated stays 24 extending thereacross in substantially parallel relation to each other, FIG. 1. The stays 24 may be made of any suitable resilient material, such as, for example, spring steel, and are so disposed in each of the panels 15–17 of the loading dock shelter 1 that they yieldingly urge each of the panels 15–17 to remain in their normal, at-rest position, wherein they extend across the front of the doorway, in substantially parallel relation thereto. In such position, the side curtains 16 and 17 are preferably disposed in uniplanar relation to each other and the top panel 15 projects substantially vertically downwardly across the upper portion of the doorway 4, forwardly of the side panel 16 and 17.

The outer ends of each of the stays 24 are secured by nails or screws 25 to the front frame members 13 of the respective walls 8–9 to which the cover panels 15–17 are secured.

The loading dock shelter 1 shown herein embodies two resilient, compressible cushions 26 and 27, FIG. 1, which afford bottom walls for the cover 6. The cushions 26 and 27 are identical in construction, except that they are reverse or mirror images of each other. As illustrated in FIGS. 2 and 3 with respect to the cushion 27, each of the cushions 26 and 27 embodies a substantially rectangular-shaped resilient pad 28 closely covered by a complementary, wear-resistant casing 29, FIG. 3. The pad 28 may be made of any suitable material such as, for example, any suitable natural or synthetic, compressible, resilient resin or polymer, our preferred material being a foamed polyether. Similarly, the casing 29 may be made of any suitable material, but preferably is made of a flexible, water-repellent wear-resistant material, such as, for example, the aforementioned canvas duck or rubber-impregnated nylon fabric.

In each of the cushions 26 and 27, the cover 29 thereof is so constructed that in the finished cushion, the cover affords a substantially flat top wall 30, and a substantially flat bottom wall 31 disposed in substantially parallel relation to each other, with the walls 30 and 31 spaced from each other by a side wall 32, which extends completely around the outer periphery of the pad 28 disposed in the respective cushion 26 and 27. Preferably, each of the casings 29 has an opening in the bottom wall 31 thereof through which the pad 28 may be inserted into and removed from the casing 29 so that the pads 28 are readily replaceable, the opening preferably being normally held in closed position by suitable releasable means, such as, for example, a zipper 33, FIGS. 2 and 3.

In the preferred form of the invention shown in the drawings, the pads 28 and the covers 29 are so constructed that, in finished form, the cushions 26 and 27 embody an inner side wall 34, a rear side wall 35 and an outer side wall 36, all of which are substantially flat, with the sides 34 and 36 being disposed in substantially parallel relation to each other and, preferably substantially perpendicular to the rear wall 35; and a convex-forwardly front wall 37, extending between the side walls 34 and 36, as shown with respect to the cushion 27 in FIG. 2.

Each of the covers 29 has flaps 38 and 39 extending from the central portions of the top wall 30 and bottom wall 31, respectively, in position to project outwardly from the outer sides 36 of the cushions 26 and 27, FIG. 3. Each of the cushions 26 and 27 embodies an elongated, substantially straight rod or bar 40 disposed between the flaps 38 and 39 thereof, with the ends of the bar 40 extending outwardly from the flaps 38 and 39. The bars 40 may be made of any suitable material, such as, for example, wood or a suitable metal such as aluminum or steel, but preferably are made from a piece of wood having a rectangular-shaped transverse cross section, such as, for example, that known in the trade as a "two-by-four".

The flaps 38 and 39 extend partially around the bar 40 and are secured to the outer face thereof by suitable fastening means, such as, for example, nails or screws 41. Preferably, the flaps 38 and 39 are so disposed on the bar 40 as to hold it snugly against the side wall portion 32 of the cover 29 disposed on the outer side 36 of the respective cushions 26 and 27, with the upper flap 38 pulled more tightly around the bar 40 than the lower flap 39 so as to support the pad 28 in true horizontally extending position when the respective cushion 26 and 27 is supported by the rod 40 disposed in horizontally extending position.

Two supporting brackets 42 and 43 are mounted on and secured to the lower end portions of the adjacent faces of the side members 12 and 13, respectively, of each of the frames 11 embodied in the side walls 9 and 10 of the supporting frame 7. All of the supporting brackets 42 and 43 are identical in construction, each embodying an elongated, substantially U-shaped channel member, FIGS. 2 and 3, which is open at the top 44 thereof and closed at the bottom by a bottom wall 45. Each of the supporting brackets 42 and 43 is of such internal size and shape as to snugly receive either one of the rods 40 when the latter is inserted laterally downwardly through the upper end thereof.

The supporting brackets 42 and 43 are disposed in parallel relation on the side members 12 and 13 of the respective side frame members 11 with the open sides thereof directly facing toward each other. The rods 40 are of such length that when they are disposed in parallel relation to the outer panels 14 of the side walls 9 and 10, the ends thereof may be inserted downwardly into the supporting brackets 42 and 43 into position wherein they rest on the bottom walls 45 thereof so as to support the cushions 26 and 27, in the manner of a cantilever, in horizontally extending position between the warehouse wall 2 and the side panels 16 and 17, respectively, of the cover 6. Suitable fastening members, such as, for example, a pin or a bolt 47 may be inserted laterally through each of the brackets 42 and 43 above the rod 40 mounted therein, to thereby secure the rod 40 against removal therefrom.

The supporting brackets 42 and 43 are preferably mounted on the side walls 9 and 10 of the supporting frame 7 in position to support the cushions 26 and 27 thereon with the lower face of the latter disposed in uniplanar relation to the bottom edges of the side panels 16 and 17, respectively, of the cover 6, when the cushions are disposed in normal, at-rest position. The cushions 26 and 27, preferably, are such size that when they are mounted in operative position in the supporting brackets 42 and 43, the rear faces 35 thereof are disposed in abutting engagement with the outer face of the wall 2 of the warehouse 3; the outer faces 36 are disposed in abutting engagement with the inner side edge of the side member 12 of the frame 11 embodied in the respective side walls 9 and 10; the side panels 16 and 17 of the cover 6 extend inwardly from the side walls 9 and 10, respectively, a greater distance than the cushions 26 and 27; and the central portion of the arcuate front side 37 engages the inner face of the side panels 16 and 17, respectively, of the cover 6, as shown in FIG. 2 with respect to the cushion 27.

With the loading dock shelter 1 constructed in this manner, the curtains 15–17 are disposed in substantially parallel relation to the wall 2 of the warehouse 3, when they are disposed in normal at-rest position. When a truck backs into operative engagement with the shelter 1, it presses the head curtain 15 and the side curtains 16 and 17 rearwardly toward the doorway 4 in such position that the curtains 15–17 are draped over the rear end of the top and sides of the truck, the stays 24 yieldingly deflecting rearwardly around their connections to the supporting frame 7 to permit such movement of the curtains 15–17. The resiliency of the stays 24 is effective to urge the thus rearwardly deflected curtains 15–17 forwardly toward normal position, and are effective to hold the curtains 15–17 in firm sealing engagement with the top and side walls of the truck, so as to afford an effective, substantially weather-proof seal therebetween. Also, the stays 24 are effective to prevent dislodgment of the panels 15–17 from their sealing engagement with the top and side walls of the truck by outside force, such as, for example, the wind, and the like, or by shifting of the truck during loading and unloading operations.

In addition, with the loading dock shelter 1 constructed in the aforementioned manner, the cushions 26 and 27 are so constituted and arranged as to effectively hold the side curtains 16 and 17 outwardly away from the warehouse wall 2 when the side curtains 16 and 17 are in normal at-rest position. Also, when a truck, such as the truck 5, diagrammatically shown in FIG. 2, is backed into the loading dock shelter 1 in operative engagement therewith, the curved configuration of the outer side 37 of each of the cushions 26 and 27 permits the inner edge portions 19 of the side panels 16 and 17 of the cover 6 initially to move inwardly toward the warehouse wall 2 into wrap-around engagement with the engaging portions of the truck, with little or no resistance. Thereafter, continued movement of the truck 5 toward the warehouse wall 2 causes the cushions 26 and 27 to be progressively compressed from the centers of the front sides 37 thereof toward the inner sides 34 thereof to thereby afford a progressive, positive forward force on the inner edge portions 19 of the curtains 16 and 17 effective to yieldingly urge the lower end portions of the curtains 16 and 17 into wrap-around engagement with the portions of the truck engaged therewith. Also, further inward movement of the truck 5 toward the warehouse wall 2 is effective to compress the cushions 26 and 27 to afford such yielding pressure on the side curtains 16 and 17 thereby afford such a wrap-around effect even on obstructions which may be projecting from the truck, such as, for example, the obstruction 48 diagrammatically shown in FIG. 2.

Preferably in the loading dock shelter 1, the cushions 26 and 27 are of substantially greater length, between the rear side 35 and the front side 37 thereof, than the width, between the inner side 34 and the outer side 36 thereof. Also, preferably, the cushions 26 and 27 have a thickness, in a vertical direction between the top wall 30 and the bottom wall 31 of the casings 29, which, while being of substantial magnitude, is substantially less than either the aforementioned length or width thereof. Thus, preferably, the aforementioned lengths and widths of the cushions 26 and 27 are not substantially less than 12 inches and not substantially more than 24 inches, with the length preferably being in the nature of 24 inches and the width preferably being in the nature of 18 inches; and the aforementioned thickness of the cushions 26 and 27 is not substantially less than 3 inches, nor substantially more than 8 inches, and is preferably in the nature of 6 inches.

With such construction and proportioning of the loading dock shelter 1, the cushions 26 and 27 afford effective bottom walls therefor, which may be readily flexed and compressed toward the warehouse wall 2 by a truck, or the like, while still effectively insuring that the side curtains 16 and 17 will not be displaced inwardly out of engagement with the forward side 37 thereof. In addition, with the cushions 26 and 27 so constituted and arranged, they may be readily displaced and compressed in all directions so as to insure an effective seal between the lower edge portions of the side panels 16 and 17 and a truck operatively engaged therewith.

In addition, it will be seen that in the loading dock shelter 1, the cushions 26 and 27 may be readily removed and replaced, and are supported from the sides, in a novel and expeditious manner, from supports disposed at the front and rear thereof in a manner effective to insure that they extend substantially directly horizontally outwardly from a warehouse wall, such as the wall 2, in position to properly engage the lower end portions of the side curtains 16 and 17 and to properly engage a truck backed into operative engagement with the side curtains 16 and 17.

In addition, it will be seen that with the bottom walls for the loading dock shelter 1 afforded by the cushions 26 and 27, it is substantially insured that any displacement of the cushions 26 and 27 from their normal at-rest position by engagement by a truck, or the like, will cause no permanent deformation of the bottom walls of the loading dock shelter 1, and that these walls will return to their normal at-rest position upon release of such engagement therefrom.

In addition, it will be seen that the present invention affords a novel loading dock shelter which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A loading dock shelter comprising
 a. a cover comprising
  1. a top panel extending along the top of a doorway in a warehouse wall,
  2. two side panels extending downwardly from said top panel along respective sides of said doorway,
 b. a substantially rigid, elongated, supporting frame mounted on said warehouse wall for supporting said cover in outwardly spaced relation to said warehouse wall,
 c. said frame having two elongated side walls
  1. extending longitudinally along respective sides of said doorway, and
  2. projecting laterally outwardly therefrom,
 d. said side panels being attached to the outer longitudinal edges of respective ones of said side walls and projecting laterally toward each other, and
 e. means for yieldingly holding the lower portion of said side panels in outwardly spaced relation to said warehouse wall,
 f. said means comprising
  1. cushion means, and
  2. supporting means
   a. mounted on said side walls, and
   b. operatively connected to said cushion means for supporting the latter in substantially horizontally outwardly projecting relation to said warehouse wall,
 g. said cushion means comprising two cushions, each comprising
  1. a pad of resilient compressible material, and
  2. another cover mounted on said pad, and
 h. said supporting means comprising
  1. two pairs of supporting brackets mounted on respective ones of said side walls, and
  2. two elongated bars attached to a respective one of said covers, and
 i. each of said bars being mounted on and supported by a respective one of said pairs of brackets.

2. A loading dock shelter, as defined in Claim 1, and in which
 a. each of said other covers has a top wall, and
 b. each of said top walls is operatively connected to a respective one of said bars in position to support a respective one of said pads in cantilever fashion in substantially horizontally extending position from said respective bar.

3. A loading dock shelter as defined in claim 1, and in which
 a. said supporting brackets comprise elongated channel members mounted in substantially outwardly extending position and having an open end, and
 b. said bars are slidably mounted in said brackets for movement longitudinally thereof for removal therefrom through said open end.

4. A loading dock shelter as defined in claim 1, and in which a. the sides of said cushions remote from said warehouse wall are convex outwardly, in a horizontal plane away from said warehouse wall.

5. A loading dock shelter comprising
a. a cover comprising
   1. a top panel extending along the top of a doorway in a warehouse wall,
   2. two side panels extending downwardly from said top panel along respective sides of said doorway,
b. a substantially rigid, elongated, supporting frame mounted on said warehouse wall for supporting said cover in outwardly spaced relation to said warehouse wall,
c. said frame having two elongated side walls
   1. extending longitudinally along respective sides of said doorway, and
   2. projecting laterally outwardly therefrom,
d. said side panels being attached to the outer longitudinal edges of respective ones of said side walls and projecting laterally toward each other, and
e. means for yieldingly holding the lower portion of said side panels in outwardly spaced relation to said warehouse wall,
f. said means comprising
   1. cushion means, and
   2. supporting means for supporting said cushion means in cantilever fashion in inwardly projecting relation to said side walls and in substantially horizontally outwardly projecting relation to said warehouse wall,
g. said cushion means comprising two cushions, each comprising
   1. a pad of resilient compressible material, and
   2. another cover mounted on said pad, and
h. said supporting means comprising
   1. supporting brackets removably mounted on opposite sides of said doorway, and
   2. supporting bars attached to respective ones of said other covers and removably mounted on and supported by a respective one of said supporting brackets.

\* \* \* \* \*